March 17, 1942.   E. L. RIETZ   2,276,876
WHEEL
Filed March 20, 1941
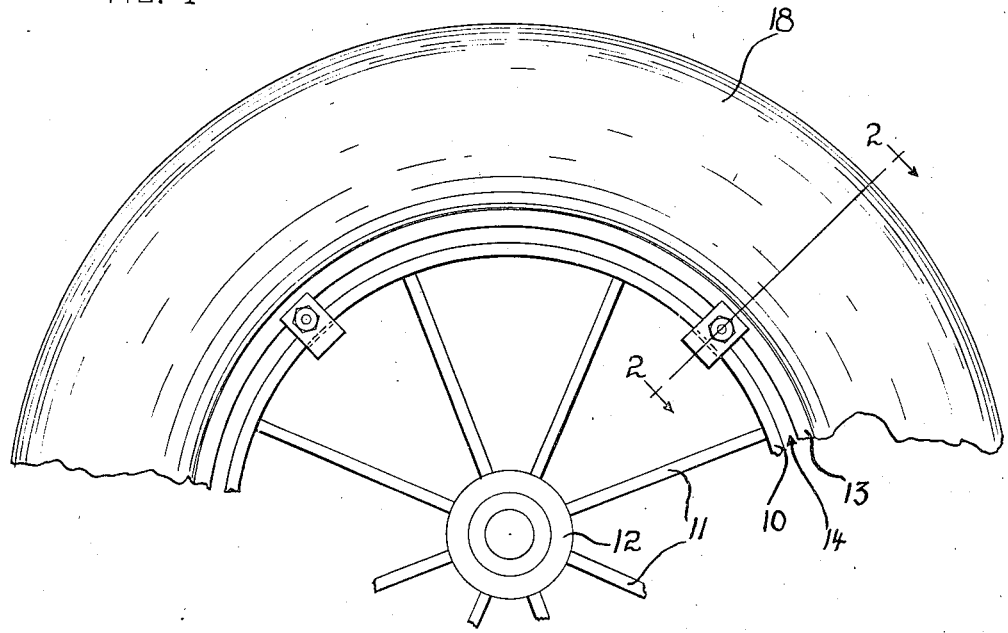
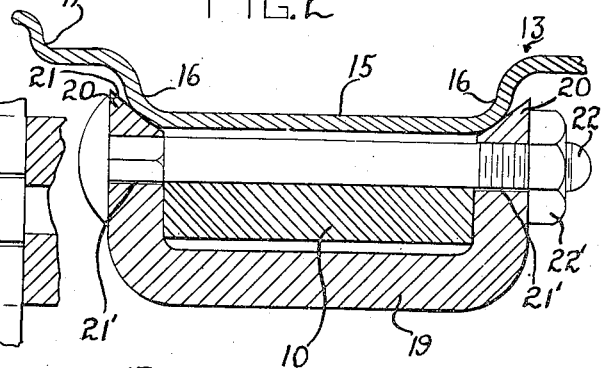
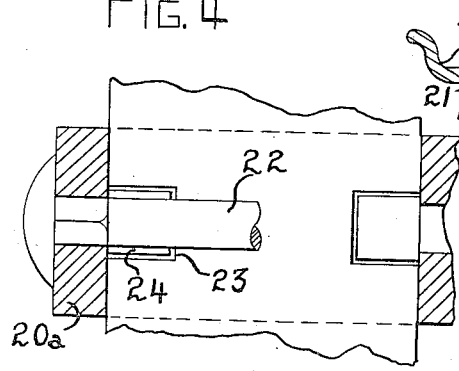
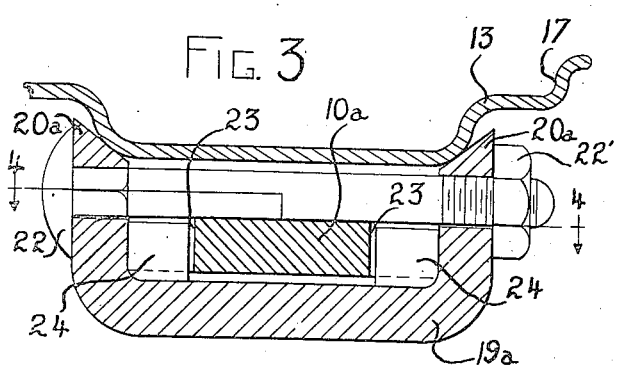
INVENTOR
Edward L. Rietz
By Paul O. Pippel
ATT'Y Patented Mar. 17, 1942

2,276,876

UNITED STATES PATENT OFFICE 2,276,876

WHEEL

Edward L. Rietz, Riverside, Ill., assignor to International Harvester Company, a corporation of New Jersey Application March 20, 1941, Serial No. 384,299

5 Claims. (Cl. 301—18)

This invention relates to a wheel structure and more particularly to a clamping means to be used in attaching an outer rim to an inner rim or felloe.

The invention is particularly adapted for use in converting ordinary steel-tired implement wheels into pneumatic-tired wheels. The usual method for making this change-over consists in first cutting the rim from the usual implement wheel and next in welding a new rim in place. This new rim is provided with a comparatively smooth outer surface, so that the installation of a pneumatic tire rim thereon is made comparatively easy. The pneumatic tire rim encircles the inner rim and is preferably spaced concentrically therefrom so that an annular space appears between the rims.

According to the present invention, means are provided in the form of a plurality of clamping members for attaching the rims together. The rims, when so attached and equipped with a pneumatic tire, provide a very desirable form of wheel for use on farm implements, although the invention is not necessarily limited to that particular use.

The principal object of the present invention is to provide a simple and efficient clamping means for use under circumstances similar to those previously referred to.

An important object is to provide a one-piece clamp in which the securing means operates outside the periphery of the inner rim so that opposite ends of the clamp are adequately drawn together to clamp the outer rim more firmly to the inner rim.

And another object is to provide a clamping means for use with an inner rim, wherein the clamp has means for engaging the inner rim to prevent angular slippage between the clamp and the rim.

A more complete understanding of the objects and desirable features of the invention may be had from the following detailed description taken in conjunction with the accompanying drawing, in which:

Figure 1 is a side elevational view of a portion of a wheel incorporating the improved construction;

Figure 2 is an enlarged sectional view taken substantially on the line 2—2 of Figure 1;

Figure 3 is a view similar to that shown in Figure 2 but illustrating a modified form of construction; and Figure 4 is a sectional view taken along the line 4—4 of Figure 3.

As shown in Figure 1, the wheel is illustrated as an ordinary spoke type wheel comprising a rim or felloe 10 connected in the usual manner by spokes 11 to a central hub 12. As previously stated, the wheel may be made up from an old implement wheel by the process of removing the old rim and substituting therefor the rim 10. A second rim 13 encircles the rim or felloe 10, and the two rims are disposed in such a manner that there is provided between the two an annular space, generally indicated at 14. It will be understood that in the process in which the rim of the old wheel is removed and the new rim substituted, the diameter of the original wheel is cut down to a comparatively great extent. This substitution is of considerable importance, since it permits the use of a pneumatic tire of a conventional size so that the overall diameter of the wheel is not materially increased. The rim 13 may be of the usual pneumatic tire type consisting of a central well 15, opposite side portions 16, and opposite annular bead seats 17. This rim serves to carry a pneumatic tire 18 in the usual manner.

According to the present invention, a plurality of clamping devices is disposed circumferentially about the wheel structure so that the two rims are rigidly secured together and in effect provide component parts of a unitary wheel. In a preferred form of the invention, each clamping means consists of a one-piece clamping body 19 shaped to provide a U having opposite legs 20. Each clamp is installed in the wheel structure so that it embraces the inner rim or felloe 10, with the opposite legs 20 extending diametrically beyond the outer periphery of the rim 10. Each leg 20 is provided with an inclined surface 21 which engages the respective side 16 of the rim 13. Each of the legs 20 is apertured as at 21' on an axis disposed outside the periphery of the rim 10. Securing means in the form of a bolt 22 is passed through the alined apertures 21' and includes a nut 22' threaded on the bolt. In the preferred construction, there are four such clamps, equally spaced about the wheel structure.

In the modified construction shown in Figure 3, the inner rim or felloe is designated at 10a. This rim is provided about its periphery with a plurality of circumferentially spaced notches 23. Both sides of the rim are notched, as shown in Figure 3, and the notches are alined transversely of the rim. There are as many sets of notches as there are clamps to be used, in the present instance four. The pneumatic tire rim is similar to that shown in Figures 1 and 2, and bears the same reference character. The clamp in this instance is shown as comprising a body 19a formed as a U and having opposite legs 20a, the function of the clamp to this extent being identically that of the clamp 19 previously described. The clamp 19a is, however, provided with a pair of lugs or engaging portions 24, respectively fitting opposite notches 23 in the rim 10. The cooperation between the notches 23 and the lugs 24 is such as to provide a means engageable between one of the rims and the clamp body for the purpose of preventing angular slippage between the two. The clamp 19a is provided with a securing means in the form of a bolt similar to that shown in Figure 2.

From the foregoing description, it will be seen that there is provided an improved clamping device, capable of assuming any one of a number of forms, two of the preferred forms being illustrated in the drawing. It is an important feature of the present invention to provide the clamp body in one piece, thereby eliminating the handling of a number of parts. It is also an important feature of the invention to dispose the securing means outside the inner rim 10. It will be seen that the securing means so placed is adapted to draw together the legs 20, thus clamping the pneumatic tire rim 13 therebetween. Other features and advantages will become apparent to those skilled in the art.

The foregoing description and drawings pertain to preferred forms of the invention, and it will be understood that numerous modifications and alterations may be made therein without departing from the spirit and scope of the invention as defined in the appended claims.

What is claimed is:

1. In a wheel structure having an outer rim and an inner rim, rim clamping means for attaching the outer rim concentrically about the inner rim, the rims when assembled having an annular space therebetween, said means comprising a plurality of clamping devices, each including a U-shaped member adapted to fit the inner rim from its inner side with the legs of the U extending diametrically outwardly and adapted to engage respectively opposite side portions of the second rim, said legs being apertured on an axis diametrically outwardly of the periphery of the inner rim and inwardly of the inner periphery of the outer rim, and a bolt passed through said apertures between the rims and adapted to draw the legs of the U together to clamp the outer rim.

2. In a wheel structure having an outer rim and an inner rim, rim clamping means for attaching the outer rim concentrically about the inner rim, the rims when assembled having an annular space therebetween, said means comprising a plurality of clamping devices, each including a U-shaped member adapted to fit the inner rim from its inner side with the legs of the U extending diametrically outwardly and adapted to engage respectively opposite side portions of the second rim, and securing means passed between the rims and engaging the legs to draw the legs together to clamp the outer rim.

3. In a wheel structure having an inner rim, and an outer rim encircling said inner rim, the rims being disposed concentrically with an annular space between the inner periphery of the outer rim and the outer periphery of the inner rim, clamping means for securing the rims together, comprising a plurality of clamp devices, each including a one-piece member embracing the inner periphery of the inner rim and having opposite portions extending diametrically outwardly from the inner rim and respectively engaging opposite sides of the outer rim, and securing means disposed in the aforesaid space between the rims and engaging the aforesaid extending portions to clamp the outer rim.

4. In a wheel structure having an inner rim provided with a plurality of circumferentially spaced notches, and an outer rim encircling said inner rim, the rims being disposed concentrically with an annular space between the inner periphery of the outer rim and the outer periphery of the inner rim, clamping means for securing the rims together comprising a plurality of clamp devices disposed circumferentially about the rims and respectively alined with the aforesaid notches, each including a one-piece member embracing the inner rim and having opposite portions extending diametrically outwardly from the inner rim and respectively engaging opposite sides of the outer rim, a lug on the clamp engaging the respective notch and in the rim, and securing means disposed in the aforesaid space between the rims and engaging the aforesaid extending portions to clamp the outer rim.

5. In a wheel structure including an inner rim and a larger outer rim encircling the inner rim so that an annular space appears between the rims, clamping means for securing the rims together comprising a plurality of clamp devices arranged circumferentially about the rims, each device including opposite, transversely alined portions disposed respectively at opposite edges of the inner rim, each portion engaging the portion of the inner periphery of the inner rim and extending radially outwardly therefrom to engage an edge portion of the outer rim, each portion having an aperture and said aperture being alined transversely of the rim on an axis passing transversely through the annular space between the rims, and a bolt disposed on said axis and passing through the apertures for connecting the portions and securing the rims together.

EDWARD L. RIETZ.